US012439256B2

(12) United States Patent
Pal et al.

(10) Patent No.: US 12,439,256 B2
(45) Date of Patent: Oct. 7, 2025

(54) PROVIDING A TERMINAL DEVICE WITH A SECURE REMOTE SERVICE CONNECTION

(71) Applicant: Target Brands, Inc., Minneapolis, MN (US)

(72) Inventors: Arnab Pal, Rogers, MN (US); Adam Nawrocki, Plymouth, MN (US); Elisa Clark, Bloomington, MN (US); Richard Ryan Walstrom, Champlin, MN (US); Robert M. Renkor, Bloomington, MN (US); David Pankratz, Minneapolis, MN (US); Dylan Essing, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 84 days.

(21) Appl. No.: 18/584,844

(22) Filed: Feb. 22, 2024

(65) Prior Publication Data

US 2025/0274758 A1 Aug. 28, 2025

(51) Int. Cl.
*G06F 21/00* (2013.01)
*H04W 12/084* (2021.01)
*H04W 12/088* (2021.01)

(52) U.S. Cl.
CPC ....... *H04W 12/084* (2021.01); *H04W 12/088* (2021.01)

(58) Field of Classification Search
CPC ............................ H04W 12/084; H04W 12/088
See application file for complete search history.

(56) References Cited

U.S. PATENT DOCUMENTS

| | | | |
|---|---|---|---|
| 2012/0042066 A1* | 2/2012 | Chatterjee | H04L 41/0663 709/224 |
| 2013/0003531 A1 | 1/2013 | Dow et al. | |
| 2013/0013434 A1* | 1/2013 | Fisher | G06Q 20/04 705/18 |
| 2013/0166425 A1 | 6/2013 | Chen et al. | |
| 2013/0173474 A1* | 7/2013 | Ranganathan | G06Q 20/0655 705/67 |
| 2016/0182289 A1 | 6/2016 | Kamrowski | |
| 2017/0099626 A1 | 4/2017 | Privette | |
| 2017/0339134 A1 | 11/2017 | Han et al. | |
| 2019/0394042 A1 | 12/2019 | Peddada | |

(Continued)

*Primary Examiner* — Ghazal B Shehni
(74) *Attorney, Agent, or Firm* — Barnes & Thornburg LLP

(57) ABSTRACT

In some implementations, a computer system for providing a terminal device with a secure remote service connection can include the terminal device, an internet connection device, and a remote server. A temporary local wireless network and a sharable internet connection can be established by the internet connection device, and connection information can be output for the temporary local wireless network. The terminal device can detect the connection information and can connect to the temporary local wireless network. A secure connection can be established between the terminal device and the remote server. After establishing the secure connection, the remote server can receive operator credentials from the terminal device, and can transmit an access token to the terminal device. The terminal device can transmit a request to access a terminal device service hosted by the remote server, and the remote server can execute application code for the terminal device service.

20 Claims, 9 Drawing Sheets

(56) References Cited

U.S. PATENT DOCUMENTS

| | | |
|---|---|---|
| 2020/0160309 A1 | 5/2020 | Vick et al. |
| 2020/0273037 A1* | 8/2020 | Phillips .................. G06Q 20/40 |
| 2021/0365950 A1 | 11/2021 | Waughtal |
| 2021/0383343 A1 | 12/2021 | Mangtani et al. |
| 2022/0263655 A1 | 8/2022 | Murray |
| 2023/0085027 A1 | 3/2023 | Vetter et al. |
| 2023/0198968 A1 | 6/2023 | Medvinsky et al. |

* cited by examiner

PROVIDING A TERMINAL DEVICE WITH A SECURE REMOTE SERVICE CONNECTION

TECHNICAL FIELD

This specification generally relates to techniques for providing a terminal device with a secure remote service connection, for example, using a certificate-based trust negotiation protocol.

BACKGROUND

Point of sale (POS) systems are generally used in physical retail stores to facilitate customer transactions. POS systems can include POS terminals, such as customer-operated terminals and employee-operated terminals, which can interface with multiple different components to scan products and process transactions. For example, a POS system can include a product scanner to identify products (e.g., a barcode scanner, a QR code scanner), a payment terminal for accepting payment (e.g., a credit card reader), a display to present information about scanned products and transactions, and a conveyor system to hold and transport products as part of the checkout process (e.g., a conveyor belt holding and conveying products that are yet to be scanned during a checkout process). The POS terminal can compile transaction information and communicate with the payment terminal to complete a transaction.

POS terminals can be provided in stationary and mobile configurations. A stationary POS terminal can be a POS terminal that is affixed to a structure, such as the floor or a wall, or that is otherwise not readily movable or portable by a user. Such stationary POS terminals can include, for example, self-checkout POS terminals and employee-operated POS terminals organized with adjacent checkout lanes. A stationary POS terminal can incorporate various peripheral devices, software, and services, such as displays, payment card readers, scales, scanners, and printers. A mobile POS device can be a handheld device with an integrated display and payment card reader, but may lack other peripheral devices of the stationary POS terminal. Both the stationary POS terminal and the mobile POS device can communicate with backend server systems to access transaction services.

SUMMARY

This document generally describes computer systems, processes, program products, and devices for providing a terminal device with a secure remote service connection. In general, a terminal device (e.g., a point of sale (POS) device, a kiosk, or another sort of terminal device) can connect to a co-located server (e.g., in a same facility or complex) to receive backend application services (e.g., using an application programming interface (API) architecture). A connection to the backend application services can be provided over a local area network (LAN). As an alternative backup, the application services can also exist on a remote server (e.g., remote from the facility or complex in which the terminal device is located) that is accessible to the terminal device over a wide area network (WAN). Both the LAN and the WAN, for example, can be private networks under the control of an organization, and are considered to be secure. However, if a hardware/network/power failure were to occur that impacts the co-located server and/or the private networks (e.g., the LAN/WAN), the backend application services would become inaccessible to the terminal device, rendering the terminal device mostly unusable. Assuming that the terminal device still has power, use of the terminal device can be continued by establishing an alternate connection to the application services provided by the remote server, over the public internet. Since communications over the public internet are inherently insecure, various techniques can be used to quickly establish the alternate connection while maintaining security.

To establish a secure alternate connection with the application services provided by the remote server, a mobile internet connection device (e.g., a handheld computing device) can be used to establish a temporary local wireless network and a sharable connection to the public internet. The mobile internet connection device can generate and output connection information for use in connecting to the local wireless network, and the terminal device can use its scanning hardware to detect the connection information that has been generated and output by the mobile internet connection device. The terminal device can then use the connection information to connect to the local wireless network provided by the mobile internet connection device, and can connect to the remote server via the sharable internet connection. After connecting to the remote server, a certificate-based protocol can be used to ensure trust between the terminal device and the remote server, and a secure connection (e.g., a VPN tunnel) can be established between the remote server and the terminal device. Once the secure connection has been established, an additional credential-based protocol can be used to ensure trust between the terminal device and the application services provided by the remote server. Once the multiple layers of trust have been ensured, the terminal device can resume operation using the remote terminal device services.

While the technology for providing a terminal device with a secure remote service connection is primarily described here in the context of providing an alternate and secure connection to remote services in the event of a hardware/network/power failure, other uses of the technology may exist. For example, the technology may be used to provide a connection to remote terminal device services if the terminal device were to be moved outside of the facility or complex in which the private network (e.g., the LAN/WAN) exists. Thus, the terminal device, which may normally be considered as a stationary device can itself become a mobile device when paired with a mobile internet connection device. Further, the terminal device can access application services over the public internet without having its own long-range wireless hardware (e.g., LTE, 5G, etc.).

In some implementations, a computer system for providing a terminal device with a secure remote service connection can include the terminal device, an internet connection device, and a remote server. The terminal device, the internet connection device, and the remote server can each include one or more processors, memory, and storage devices storing respective instructions that, when executed, cause the respective terminal device, internet connection device, and remote server to perform operations including: establishing, by the internet connection device, a temporary local wireless network and a sharable internet connection, and outputting connection information for the temporary local wireless network; detecting, by the terminal device, the connection information that has been output by the internet connection device, and in response to detecting the connection information, using the connection information to connect to the temporary local wireless network; establishing, by the terminal device and the remote server, a secure connection between the terminal device and the remote server, over the temporary local wireless network and the sharable internet connection established by the internet connection device; after establishing the secure connection, receiving, by the remote server and from the terminal device over the secure connection, operator credentials submitted at the terminal device, and in response to receiving the operator credentials, transmitting, by the remote server and to the terminal device over the secure connection, an access token; transmitting, by the terminal device and to the remote server over the secure connection, a request to access a terminal device service hosted by the remote server, along with the access token; and in response to receiving the request to access the terminal device service along with the access token, executing application code for the terminal device service, by the remote server.

Other implementations of this aspect include corresponding computer methods, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can include any, all, or none of the following features. The terminal device and the internet connection device can have a short-range wireless connection over the temporary local wireless network. The internet connection device and the remote server can have a long-range wireless connection over a public internet. The internet connection device can serve as a communication bridge between the terminal device and the remote server. The short-range wireless connection can be a WiFi connection. The temporary local wireless network can be a Wi-Fi network. The long-range wireless connection over the public internet can be a long term evolution (LTE) or 5G connection that is provided via a communication tower that is in range of the internet connection device. The connection information for the temporary local wireless network can include a service set identifier (SSID) and a password for the temporary local wireless network. The connection information for the temporary local wireless network can be usable for a single network session facilitated by the internet connection device and not used again after the single network session is complete. Multiple terminal devices can be in communication with the internet connection device during the single network session, and each terminal device can use the same connection information. The connection information can be visually output by a display of the internet connection device. Detecting the connection information by the terminal device can include performing a scan of the connection information using scanning hardware of the terminal device. The connection information can be output by the internet connection device in a non-visual manner, and detecting the connection information by the terminal device can include using non-visual detection hardware of the terminal device to detect the connection information. Establishing the secure connection between the terminal device and the remote server can include: receiving, by a virtual private network (VPN) infrastructure of the remote server, a request for the secure connection; in response to receiving the request for the secure connection, transmitting, by the VPN infrastructure, a VPN infrastructure certificate for receipt by the terminal device; after receiving the VPN infrastructure certificate, validating the VPN infrastructure certificate, by the terminal device and based on VPN infrastructure certificate validation data provided by a certificate authority; in response to validating the VPN infrastructure certificate, transmitting, by the terminal device, a terminal device certificate for receipt by the VPN infrastructure of the remote server; and after receiving the terminal device certificate, validating the terminal device certificate, by the VPN infrastructure and based on terminal device certificate validation data provided by the certificate authority. The remote server can include a virtual private network (VPN) infrastructure. The secure connection can be a VPN tunnel between the terminal device and the remote server. A credential manager of the remote server can determine whether the operator credentials are valid. The access token can be transmitted to the terminal device in response to the credential manager determining that the operator credentials are valid. The access token can include access permissions data for the terminal device service, for an operator that is currently logged in to the terminal device. The terminal device service can be an application programming interface (API) that is hosted by the remote server. The request to access the terminal device service can be an API call. The terminal device can determine that access to a private network has been restored. The private network can provide a connection to a local server that hosts a local version of the terminal device service. In response to determining that access to the private network has been restored, use of the temporary local wireless network and the sharable internet connection can be discontinued. The terminal device can establish a connection to the private network, and can access the local version of the terminal device service. In response to detecting the connection information, a short-range radio of the terminal device can be turned on. In response to determining that access to the private network has been restored, the short-range radio of the terminal device can be turned off. After use of the terminal local wireless network has been discontinued by the terminal device, the temporary local wireless network can be terminated by the internet connection device. Before accessing the local version of the terminal device service, the memory of the terminal device can be wiped, and a terminal device application of the terminal device can be re-installed. A timer can be started, that tracks an amount of time that has elapsed since the operator credentials have been submitted. In response to receiving the request to access the terminal device service, a determination can be performed of whether the amount of time that has elapsed exceeds a threshold amount of time. The application code for the terminal device service can be executed when the amount of time that has elapsed does not exceed the threshold amount of time. The remote server can receive from the terminal device, a subsequent request to access the terminal device service. In response to receiving the subsequent request to access the terminal device service, a determination can be performed of whether the amount of time that has elapsed exceeds the threshold amount of time. An operator of the terminal device can be prompted to resubmit the operator credentials when the amount of time that has elapsed exceeds the threshold amount of time.

The systems, devices, program products, and processes described throughout this document can, in some instances, provide one or more of the following advantages. In the event of power/equipment/network failures, an alternate connection can be provided to remote backup services for terminal devices, to ensure continued operation devices while local servers and networks are being serviced. A service-based application architecture can be employed to improve maintainability of the application code, and to conserve network bandwidth and computer processing resources. Specialized techniques for establishing a temporary local wireless network and providing network connections can reduce attempted access by malicious actors. A virtual private network (VPN) tunnel can be established between a VPN infrastructure a terminal device, to prevent eavesdropping and other harmful actions from malicious actors that may exist on a public internet. A certificate-based process can be used for establishing a secure connection between a terminal device and the VPN infrastructure, and a separate operator authentication process can be used for establishing trust between the terminal device and remote terminal device services, thus providing multiple layers of security and trust between the terminal device and a remote server. A terminal device can access application services over the public internet without having its own long-range wireless hardware. A rebuild process can be performed to ensure a virus-free system environment. An access timer can be maintained to reduce the likelihood of attacks from malicious actors while a terminal device is connected to the public internet.

Other features, aspects and potential advantages will be apparent from the accompanying description and figures.

DESCRIPTION OF DRAWINGS

Like reference symbols in the various drawings indicate like elements.

DETAILED DESCRIPTION

This document describes technology that can provide a terminal device with a secure remote service connection. In a connection operation that is facilitated by the presently described technology, an internet connection device can establish a temporary local wireless network and a sharable internet connection, and can output connection information for the temporary local wireless network. The terminal device can detect the connection information, and can use the connection information to connect to the temporary local wireless network. A secure connection can be established between the terminal device and the remote server, over the temporary local wireless network and the sharable internet connection. After the secure connection has been established, operator credentials can be provided from the terminal device to a remote server over the secure connection, and in response, an access token can be transmitted from the remote server to the terminal device. The terminal device can then access a terminal device service hosted by the remote server, using the access token, and the remote server can run application code for the terminal device service.

Figure 1:
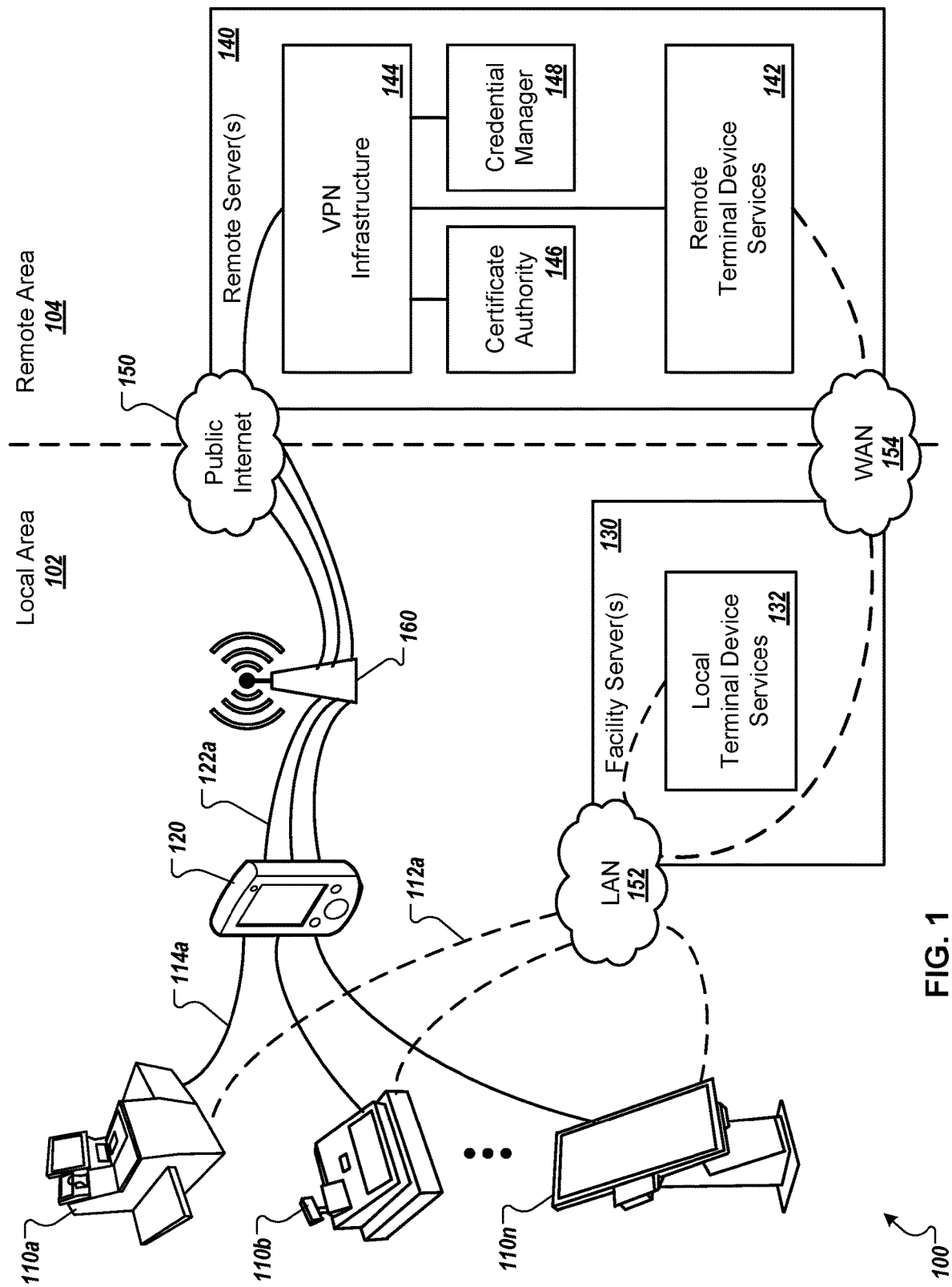
FIG. 1 depicts an example system including terminal devices, an internet connection device, a facility server, and a remote server.

FIG. 1 depicts an example system 100 including terminal devices 110*a-n*, an internet connection device 120, one or more facility servers 130, and one or more remote servers 140. Communication between devices and servers in the system 100, for example, can occur over one or more communication networks, including a LAN (local area network) 152, a WAN (wide area network) 154, and or public internet 150. In the present example, the terminal devices 110*a-n*, the internet connection device 120, and the facility server(s) 130 are co-located in a local area 102 (e.g., being located in a same facility or complex that is serviced by the LAN 152), whereas the remote server(s) 140 is/are located in a remote area 104 (e.g., being located in a different facility that is remote from the terminal devices 110*a-n*, the internet connection device 120, and the facility server(s) 130, and is not serviced by the LAN 152). The remote server(s) 140 can be accessible to devices/servers in the local area 102, for example, over the WAN 154 and/or the public internet 150.

As shown in the present example, the facility server(s) 130 can host local terminal device services 132 (e.g., computer application services that provide functionality and data for each of the terminal devices 110*a-n*), whereas the remote server(s) 140 can host remote terminal device services 142 (e.g., a remote version of the local terminal device services 132 that can be provided as an alternative and/or backup). In general, the terminal devices 110*a-n* can be configured to communicate with the facility server(s) 130 over the LAN 152 to access the local terminal device services 132. However, if the facility server(s) 130 were to fail, the terminal devices 110*a-n* could instead communicate with the remote server(s) 140 over the WAN 154, to access the remote terminal device services 142. As another possibility, if the facility server(s) 130 were to fail and the networks operating in the local area 102 (e.g., the LAN 152 and/or the WAN 154) were to also fail (e.g., due to a power loss in a portion of the facility that includes the facility server(s) 130 and the network equipment, or due to another sort of localized equipment failure), the terminal devices 110*a-n* could instead use a connection to the public internet 150 provided by the internet connection device 120 via an access point 160 (e.g., a communications tower or another sort of access point that is in range of the facility or complex), to acquire an alternate connection to the remote terminal device services 142. By using the alternate connection to the remote terminal device services 142, for example, terminal operations can continue while the facility server(s) 130 and/or the LAN 152/WAN 154 networks are being repaired.

In general, the terminal devices 110*a-n* can operate in a facility (e.g., a warehouse, a store, an office building, a stadium, a transportation hub, or another sort of structure), or a facility complex (e.g., a group of facilities with devices/servers that are in communication over the LAN 152) within the local area 102. Each of the terminal devices 110*a-n*, for example, can represent a stationary computing device that includes one or more processors, memory, and data storage devices. The terminal devices 110*a-n*, for example, can each include and/or communicate with one or more input devices (e.g., touchscreens, keypads, pointers, data collection devices, etc.) and one or more output devices (e.g., displays, speakers, printers, etc.), which are sometimes referred to as "peripheral devices" of the terminal devices 110*a-n*. In some examples, the terminal devices 110*a-n* can represent kiosks (e.g., information kiosks, ticket kiosks, etc.), point of sale (POS) devices (e.g., point of sale registers, self-checkout stations, etc.), or other sorts of devices that facilitate the exchange of information and/or the performance of transactions. In such implementations in which a terminal device is configured as a POS device (e.g., a checkout device in a retail environment), the terminal device can include a display (e.g., a touchscreen display, or a non-touchscreen display combined with a user input device, such as a keypad or voice interface), a terminal housing to which and/or within which the various components are mounted, and one or more placement areas (e.g., for placing and bagging products during a checkout process). Peripherals of the terminal devices 110a-n, for example, can include a scale for weighing items during a checkout process, a scanner for scanning the items (e.g., using barcodes, radio frequency tags, object recognition, etc.), a printer for printing a receipt of a sale, a payment terminal for processing a customer's form of payment (e.g., a credit card, a gift card, etc.), and other suitable peripheral devices.

In some implementations, terminal device functionality can be provided using a service-based application framework, such as an application programming interface (API) framework. For example, each of the terminal devices 110a-n can be configured to execute a device application that includes general control logic, and that accesses computer services hosted by a server that is external to the terminal devices 110a-n, to provide specialized application functionality and data. The terminal device 110a, for example, can use its network connection 112a (e.g., a wired connection to the LAN 152) to access the local terminal device services 132 hosted by the facility server(s) 130 (e.g., one or more servers that are co-located in the same facility or complex as the terminal devices 110a-n and that are generally in communication with the devices 110a-n over the LAN 152). The local terminal device services 132, for example, can include an API framework that provides application functionality and data for the terminal device application being executed by the terminal device 110a. To provide application functionality (e.g., retrieving item data in response to an item scan, adding the item to a pending transaction, finalizing the transaction, printing a receipt, etc.), terminal device application code (e.g., code being executed by the terminal device 110a) can include calls to corresponding APIs, which can in turn access corresponding device services (e.g., local terminal device services 132), which can in turn execute application service code and access data being maintained by the facility server(s) 130. Such an application architecture can generally improve code maintainability (e.g., since core function code is not distributed to multiple terminal devices 110a-n and is instead maintained at the facility server(s) 130), and can conserve network bandwidth and computer processing resources (e.g., with the data being operated on at the facility server(s) 130, thus reducing the amount of data transmission and processing power to be used by the terminal devices 110a-n). However, such an application architecture is generally reliant on a network connection to a server that is configured to execute the application service code and to access the application data.

The facility server(s) 130 and the remote server(s) 140, for example, can each represent various forms of computing servers, including but not limited to network servers, web servers, application servers, or other suitable computing servers, and can each include one or more computing server devices. In some implementations, server operations (e.g., operations of the facility server(s) 130, operations of the remote server(s) 140, etc.) can be performed by a single computing server device, or a group of connected computing server devices. In some implementations, server operations can be distributed among one or more additional computing server devices/systems. In general, the facility server(s) 130 and the remote server(s) 140 can each be configured to provide application, login, and security services to the terminal devices 110a-n located in a facility or facility complex. To provide such services, for example, the server (s) 130, 140 can execute computer code, and can include and/or communicate with one or more data sources (e.g., including databases, file-based data sources, cached data sources, etc.).

In the present example, the facility server(s) 130 can be co-located with the terminal devices 110a-n (e.g., in a same facility or facility complex within the local area 102), and can host the local terminal device services 132, whereas the remote server(s) 140 can host the remote terminal device services 142 (e.g., a remote/backup version of the local terminal device services 132), and can be located within the remote area 104 (e.g., in a different facility or facility complex from the terminal devices 110a-n). In general, at least some functions that are provided by the applications running on the terminal devices 110a-n can be executed by the facility server(s) 130 and/or by the remote server(s) 140. For example, the local terminal device services 132 hosted by the facility server(s) 130 and the remote terminal device services 142 hosted by the remote server(s) 140 can each include backend services (e.g., accessible through APIs) that are configured to provide data (e.g., item data, payment data, etc.) and functionality (e.g., transaction capabilities, etc.) to the terminal device application(s). The terminal devices 110a-n, for example, can primarily use the local terminal device services 132 hosted by the facility server(s) 130 (e.g., accessed over the LAN 152), and can alternatively use the remote terminal device services 142 hosted by the remote server(s) 140 (e.g., in the event of an equipment and/or network failure). Access to the remote terminal device services 142 can be provided over the WAN 154 if such a network connection is available, or can alternatively be provided over the public internet 150 if the network connection is unavailable.

In the present example, the remote server(s) 140 can also include a virtual private network (VPN) infrastructure 144 for establishing secure communication channels over the public internet 150. For example, the VPN infrastructure 144 can include one or more VPN concentrators (e.g., dedicated network devices) for building VPN tunnels between client devices (e.g., the terminal devices 110a-n) and the remote server(s) 140. The VPN concentrator(s), for example, can be configured to handle many simultaneous connections from various terminal devices 110a-n over the public internet 150, while facilitating tasks such as operator authentication, network traffic encryption, and address assignment. The remote server(s) 140 shown in the present example can also include a certificate authority 146 (e.g., for providing and/or validating device certificates to facilitate trust between the terminal devices 110a-n and the remote server(s) 140), and a credential manager 148 (e.g., for facilitating operator logins of terminal devices 110a-n and providing access to computing services in the system 100). The VPN concentrator(s) provided by the VPN infrastructure 144, for example, can manage and handle terminal device access to the various services provided by the remote server(s) 140, including the certificate authority 146, the credential manager 148, and the remote terminal device services 142.

The internet connection device 120, for example, can represent various forms of mobile processing devices, including but not limited to a tablet computer, a personal digital assistant (PDA), a smartphone, or another sort of mobile processing device that is configured to wirelessly connect to the public internet 150. For example, the internet connection device 120 can include one or more input devices (e.g., touchscreens, keypads, pointers, scanners, etc.) and one or more output devices (e.g., display units, audio speakers, haptic feedback mechanisms, etc.). The internet connection device 120, for example, can also include various hardware and software components for executing computer applications. In some examples, the internet connection device 120 can be a specialized communication device, including a display, a code generation/presentation unit (e.g., for generating and presenting a code that represents a local wireless network that provides access to a sharable internet connection 122*a* available from the device 120), and multiple different wireless communication components. For example, the internet connection device 120 can include a Long Term Evolution (LTE) component, a 5G component, and/or another sort of long-range wireless component for connecting to the access point 160 of the public internet 150, and can also include a Wi-Fi component, a Bluetooth component, and/or another sort of short-range wireless component for connecting to one or more of the terminal devices 110*a-n*. When the network connection 112*a* (e.g., a wired connection) over the LAN 152 between the terminal device 110*a* and the facility server(s) 130 is lost, for example, the terminal device 110*a* can establish a wireless connection 114*a* with the internet connection device 120, which can serve as a bridge between the terminal device 110*a* and the remote server(s) 140, via the access point 160 and the public internet 150.

FIGS. 2A-2E depict an example illustrative process for providing a terminal device with a secure remote service connection via an internet connection device. The example illustrative process is described herein as being performed by the example system 200, which is similar to the example system 100 (shown in FIG. 1), and includes similar components. As part of this example illustrative process, the terminal device 110 is depicted as an example point of sale (POS) device, however the process depicted in FIGS. 2A-2E can be applied to and performed by other sorts of terminal devices as described throughout this document. In the present example, the illustrative process is shown in stages (A) to (K), which may occur in the illustrated sequence, or which may occur in a sequence that is different than in the illustrated sequence. In some examples, two or more stages (A) to (K) may be concurrent.

Figure 2A:
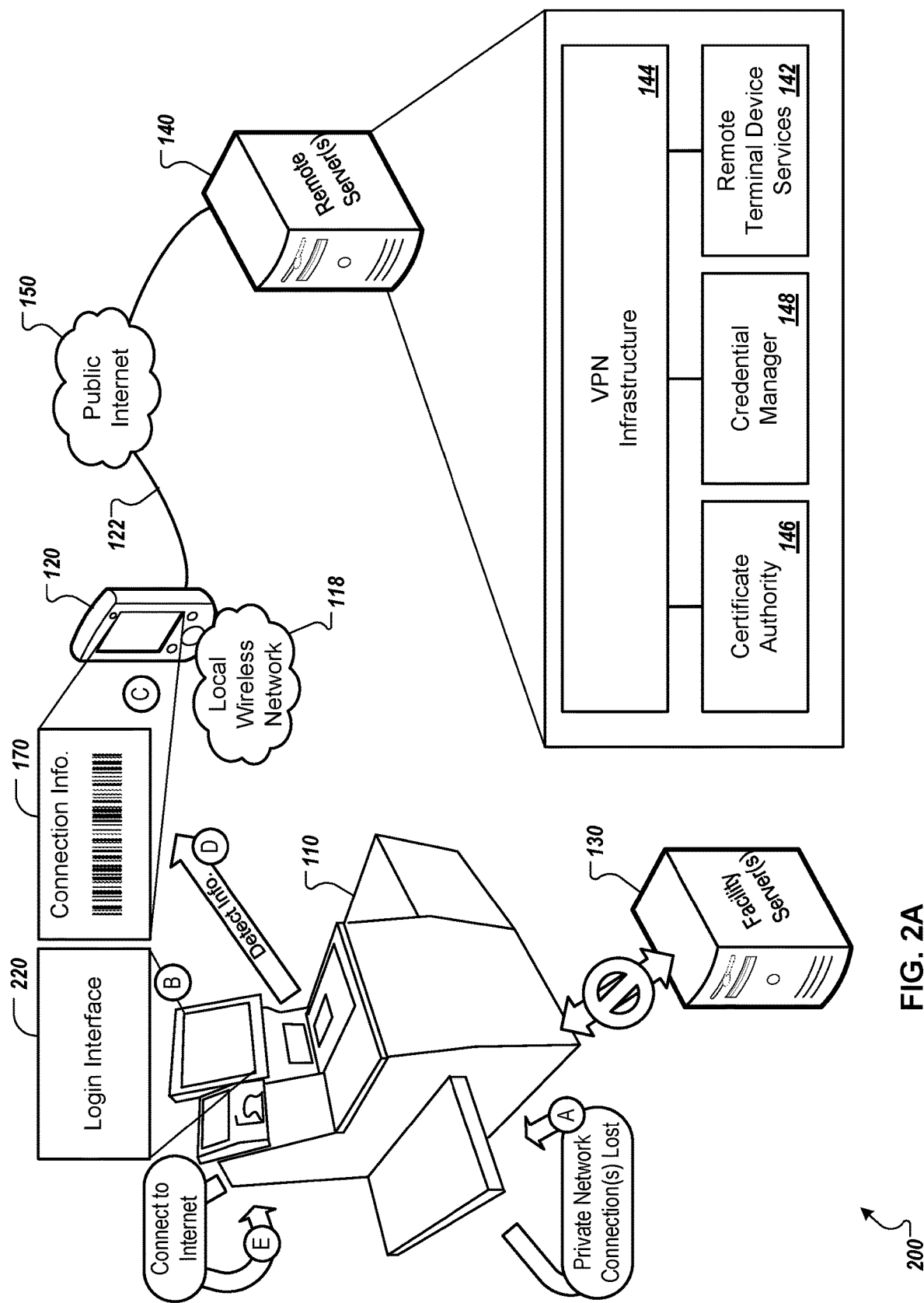
FIGS. 2A-2E depict an example illustrative process for providing a terminal device with a secure remote service connection via an internet connection device.

Referring now to FIG. 2A, during stage (A), the terminal device 110 (e.g., one of the terminal devices 110*a-n*, shown in FIG. 1) loses its private network connection to terminal device services. For example, a situation can arise in which the terminal device's LAN connection to the facility server(s) 130 and the terminal device's WAN connection to the remote server(s) 140 are both lost (e.g., due to hardware failure and/or power failure), and the terminal device 110 is unable to access either the local terminal device services 132 (shown in FIG. 1) or the remote terminal device services 142 using a private network connection. For such situations in which the hardware/power failure impacts the LAN 152 (and/or the facility server(s) 130) and the WAN 154, but not the terminal device 110 (e.g., the terminal device 110 continues to have power and continues to operate), the terminal device 110 can detect the loss of the private network connection to the terminal device services (e.g., terminal device services 132, 142), and can present a notification (e.g., a visual and/or auditory notification) that informs an operator of the device 110 of the loss of the private network connection.

During stage (B), the terminal device 110 can provide a login interface 220 (e.g., at a display of the terminal device 110). For example, an operator of the terminal device 110 can attempt to initiate a new session at the terminal device 110 that uses a different connection mechanism to access device services (e.g., the remote terminal device services 142 hosted by the remote server(s) 140). Using the login interface 220, for example, an operator of the terminal device 110 can provide their credentials (e.g., a user name and password, a personal identification number (PIN), etc.). Providing credentials, for example, can be accomplished through manual data entry (e.g., interacting with a keypad and/or microphone), use of a scanning hardware of the mobile device 140 (e.g., a code scanner, a biometric scanner, etc.), or another suitable data entry technique. When the credentials have been provided, for example, the terminal device 110 can maintain the credentials locally (e.g., cached in local memory) until such time that the credentials are to be used to authenticate an operator of the device.

During stage (C), the internet connection device 120 can generate and present connection information 170 (e.g., including a connection string and/or other connection information) for a temporary local wireless network 118 that provides access to a sharable internet connection 122 (e.g., similar to connection 122*a*, shown in FIG. 1) with the public internet 150, via the internet connection device 120. For example, an operator of the internet connection device 120 (e.g., a same operator as the operator of the terminal device 110, or a different operator) can log in to the device 120 and can launch an application on the device 120 that establishes the local wireless network 118, and generates and presents the connection information 170 for use in connecting to the established local wireless network 118. The internet connection device 120, for example, can use its long-range wireless component(s) (e.g., including a Subscriber Identity Module (SIM) card configured for connecting to a cellular network, such as Long Term Evolution (LTE) network, a 5G network, etc.) to establish a connection with the public internet 150 (e.g., via the access point 160, shown in FIG. 1), and can use its short-range wireless component(s) (e.g., a WiFi radio, a Bluetooth radio, etc.) to establish the local wireless network 118 that is accessible by one or more terminal devices.

In general, the connection information 170 for the local wireless network 118 that provides access to the sharable internet connection 122 can be used by the terminal device 110 to identify and access the local wireless network 118. For example, the connection information 170 can include an identifier (e.g., a service set identifier (SSID) or another sort of identifier) and can optionally include a connection parameter (e.g., a WPA key or another sort of password) to be used for establishing a network connection. In some implementations, the connection information can be visually displayed as a scannable code. For example, a display of the internet connection device 120 can output the connection information 170 as a quick-response (QR) code, a bar code, or another sort of visual code that is scannable by hardware of the terminal device 110. In some implementations, the connection information can be presented in a non-visual manner. For example, the internet connection device 120 can output the connection information 170 as an audio signal, a near-field communication (NFC) signal, or another sort of non-visual information.

In some implementations, various data protection techniques can be employed to obfuscate and/or protect the connection information for a local wireless network provided by an internet connection device, and/or to restrict access to the local wireless network. For example, the connection information 170 can be encrypted by the internet connection device 120 and decrypted by the terminal device 110 (e.g., using a key that is available to the terminal device application(s)). As another example, the application running on the internet connection device 120 that establishes the local wireless network 118 can generate a new identifier (e.g., an SSID or another sort of identifier) and/or a new connection parameter (e.g., a WPA key or another sort of password) for each network session with a terminal device (or a set of terminal devices for a scenario in which multiple terminal devices communicate over a same local wireless network provided by the internet connection device 120). By re-establishing the local wireless network 118 and providing a one-time usable code for each network session, for example, the internet connection device 120 can prevent unauthorized use of its local wireless network 118 and its sharable internet connection 122. As another example, the application running on the internet connection device 120 that establishes the local wireless network 118 can restrict visibility of the established local wireless network 118, thus further reducing attempted access by unauthorized devices.

During stage (D), the terminal device 110 can detect the connection information 170 being presented by the internet connection device 120. For example, an operator of the terminal device 110 can interact with the terminal device application(s), and can indicate that a pairing operation is to be performed between the terminal device 110 and the internet connection device 120. To initiate the pairing operation, for example, the internet connection device 120 can be placed in proximity to the terminal device 110, and the terminal device 110 can use visual detection hardware (e.g., a scanner, a camera, etc.) to visually recognize the connection information 170. As another example, while in proximity to the internet connection device 120, the terminal device 110 can detect the connection information 170 through the use of non-visual detection hardware (e.g., using a microphone to detect an audio signal, using a near-field communication (NFC) receiver to detect an NFC signal, etc. If multiple terminal devices are to be paired with the internet connection device 120 (e.g., terminal devices 110a-n, as shown in FIG. 1), for example, the internet connection device 120 can be sequentially moved to each of the other terminal devices, and the other terminal devices can sequentially use their detection hardware to recognize the connection information 170. In general, multiple terminal devices 110a-n can be supported by a single internet connection device 120 when the terminal devices 110a-n remain in range of the location wireless network 118, and the data usage of the terminal devices 110a-n can be supported by the capabilities of the local wireless network 118 and the sharable internet connection 122.

During stage (E), the terminal device 110 (and optionally, other terminal devices) can connect to the temporary local wireless network 118 that has been established by the internet connection device 120, using the connection information 170. For example, in response to detecting the connection information 170 (e.g., at stage (D)), the terminal device 110 can turn on its short-range wireless radio (e.g., a WiFi radio, a Bluetooth radio, or another sort of short-range wireless radio), and can identify and connect to the local wireless network 118 provided by the internet connection device 120, using the extracted connection information. (The short-range wireless radio, can normally be turned off for security purposes, for example.) The internet connection device 120, for example, can serve as a communication bridge to the public internet 150 for one or more terminal devices that have connected to its local wireless network 118, and can provide internet access for such terminal devices via its sharable internet connection 122.

Figure 2B:
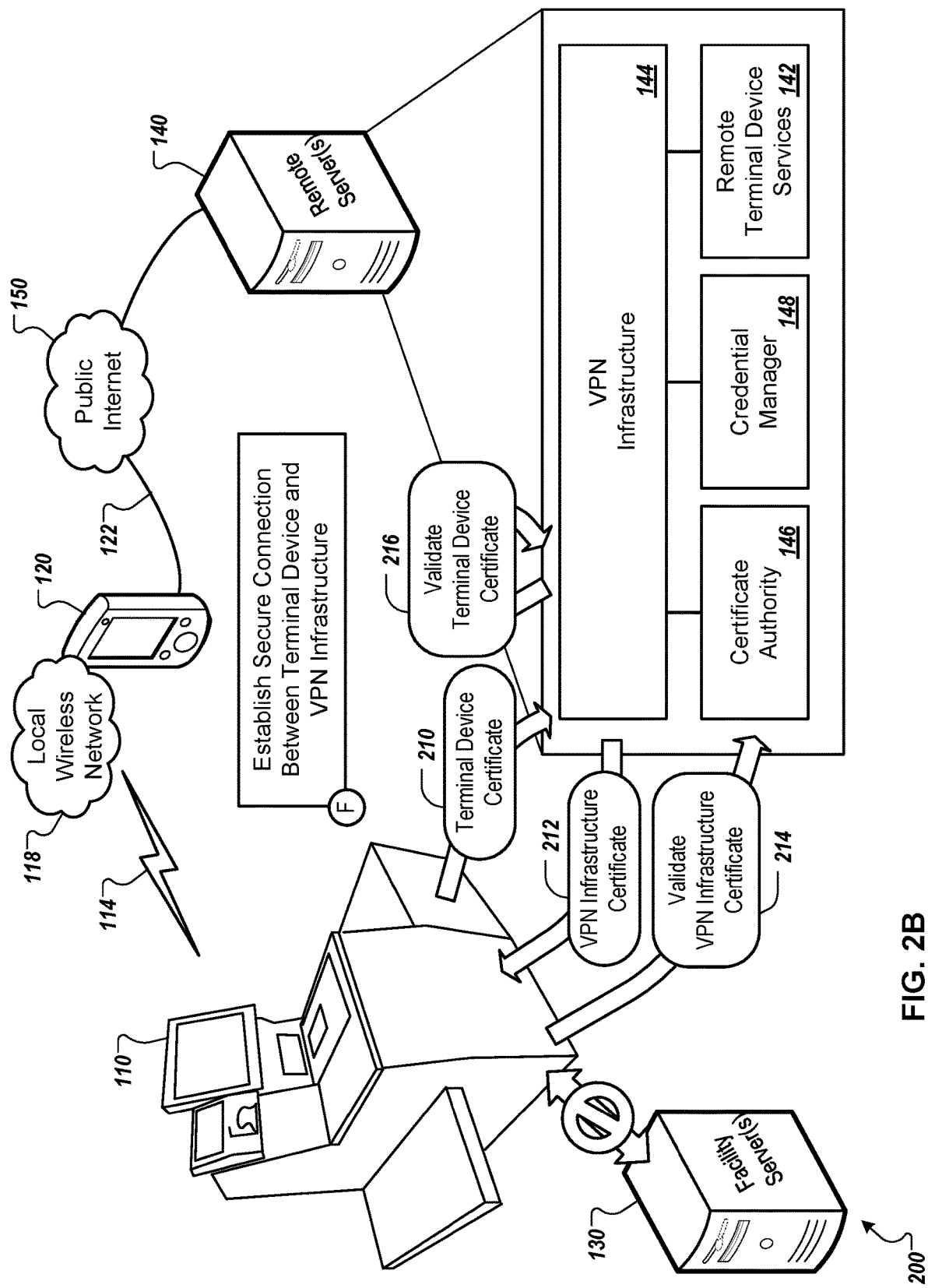

Referring now to FIG. 2B, a short-range wireless connection 114 has been established between the terminal device 110 and the internet connection device 120 (e.g., over the local wireless network 118 of the internet connection device 120), and the sharable internet connection 122 (e.g., a long-range wireless connection) has been established between the internet connection device 120 and the public internet 150. Communications that occur between the terminal device 110 and the remote server 140 (e.g., the communications shown in FIGS. 2B-2D) will be understood as occurring over the short-range wireless connection 114 and the sharable internet connection 122, with the internet connection device 120 serving as a communication bridge between the terminal device 110 and the remote server 140.

During stage (F), a secure connection can be established between the terminal device 110 and the VPN infrastructure 144 of the remote server(s) 140. In general, communication over the public internet 150 is less secure than communication over private networks (e.g., the LAN 152 and/or the WAN 154, shown in FIG. 1). To improve the security of the internet-based communication, for example, a VPN tunnel can be established between the VPN infrastructure 144 and the terminal device 110 (e.g., by a VPN concentrator of the VPN infrastructure), to prevent eavesdropping and other harmful actions from malicious actors that may exist on the public internet 150. Briefly, establishing the secure connection can include an exchange of device certificates between the terminal device 110 and the VPN infrastructure 144, with the terminal device 110 providing its terminal device certificate 210 for receipt by the VPN infrastructure 144, and with the VPN infrastructure 144 providing its VPN infrastructure certificate 182 for receipt by the terminal device 110. Further, each of the terminal device 110 and the VPN infrastructure 144 can independently validate the certificate provided by the other. For example, the terminal device 110 can communicate with the certificate authority 146 of the remote server(s) 140 to validate the VPN infrastructure certificate 212 (e.g., at 214), and the VPN infrastructure 144 can also communicate with the certificate authority 146 of the remote server(s) 140 to validate the terminal device certificate 210 (e.g., at 216). The network address of the certificate authority 146, for example, can be referenced in the application code of the terminal device 110 and can be referenced by the VPN infrastructure 144.

Figure 2C:
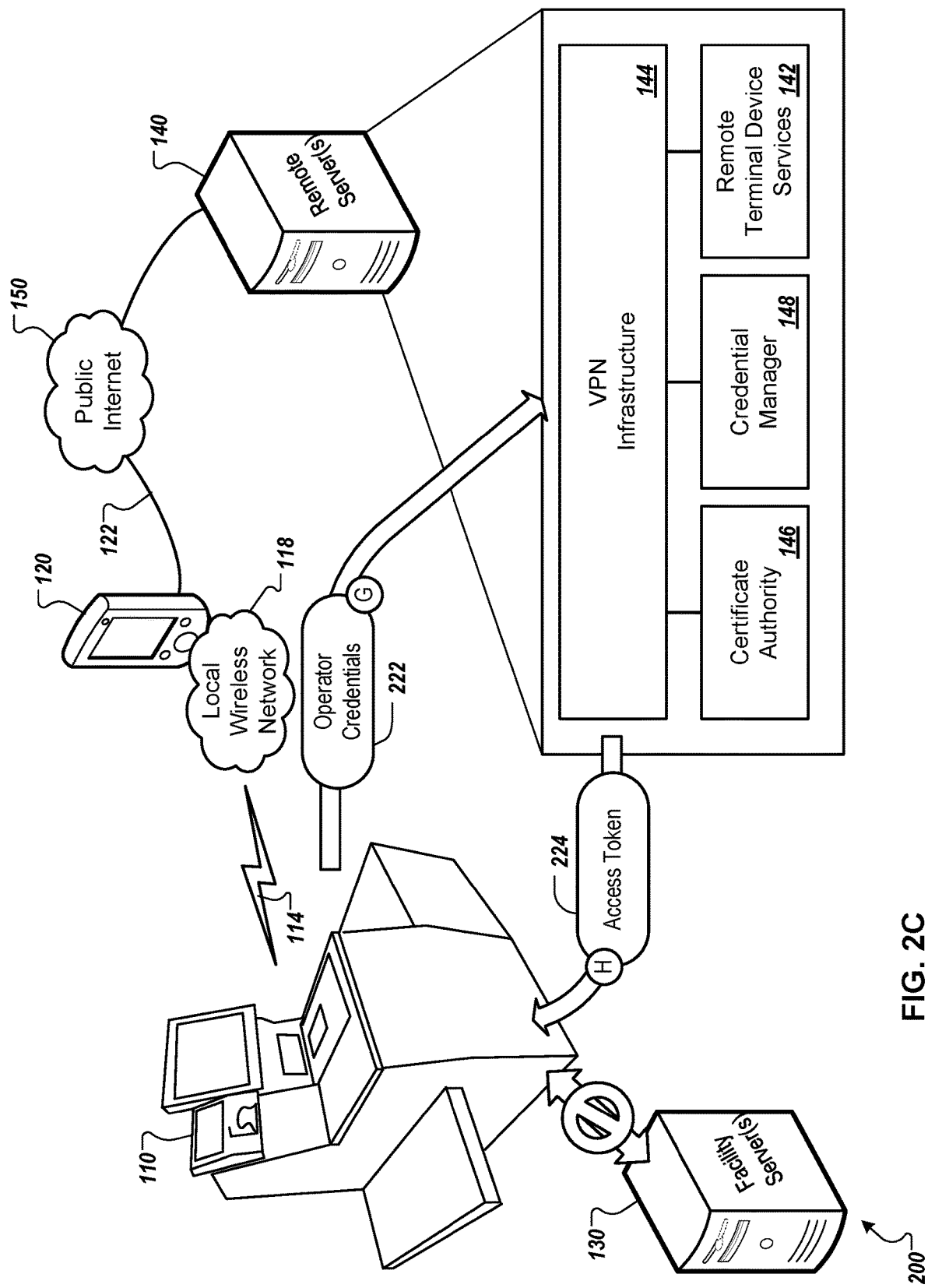
Figure 2D:
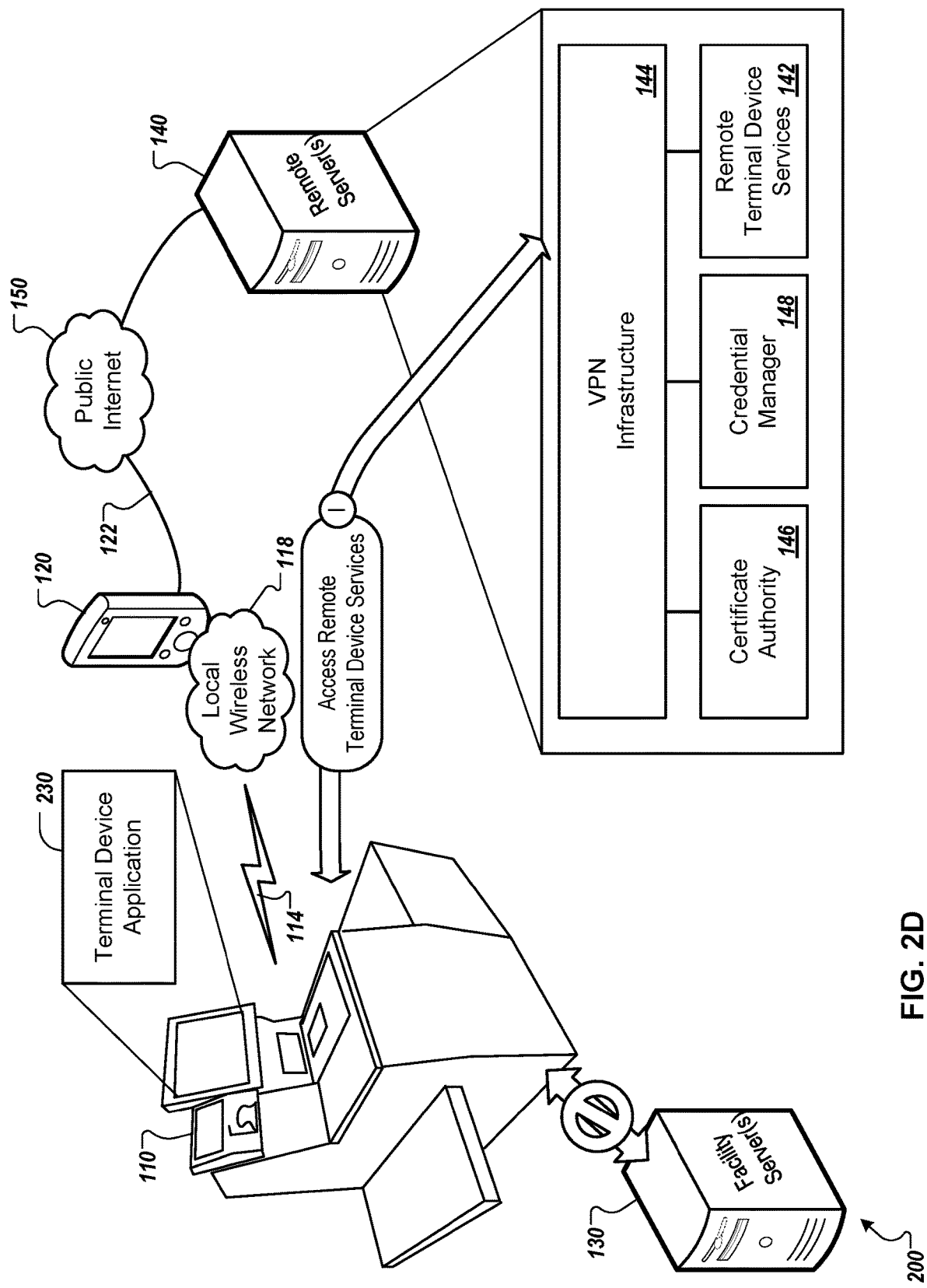
Figure 2E:
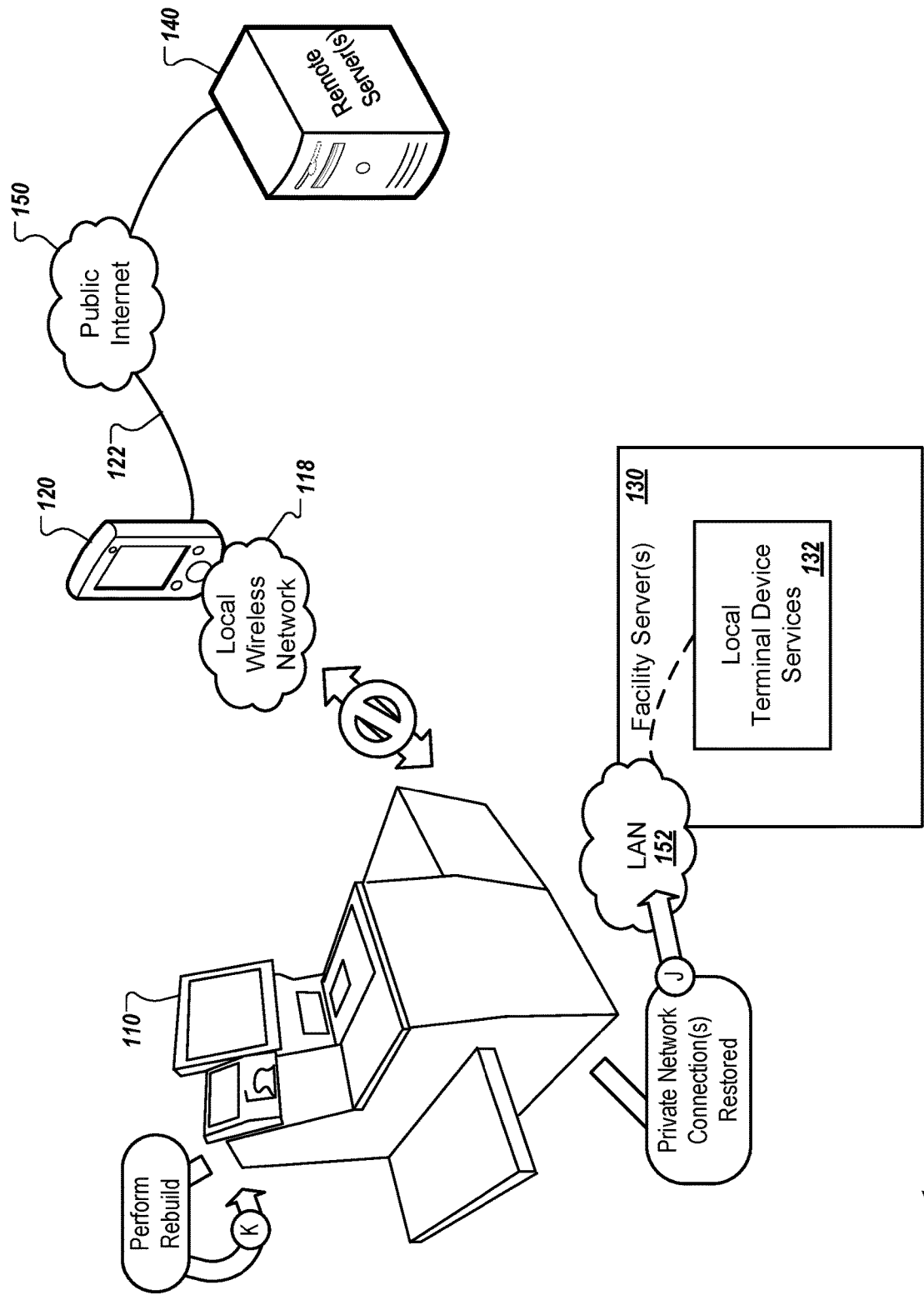
Figure 3:
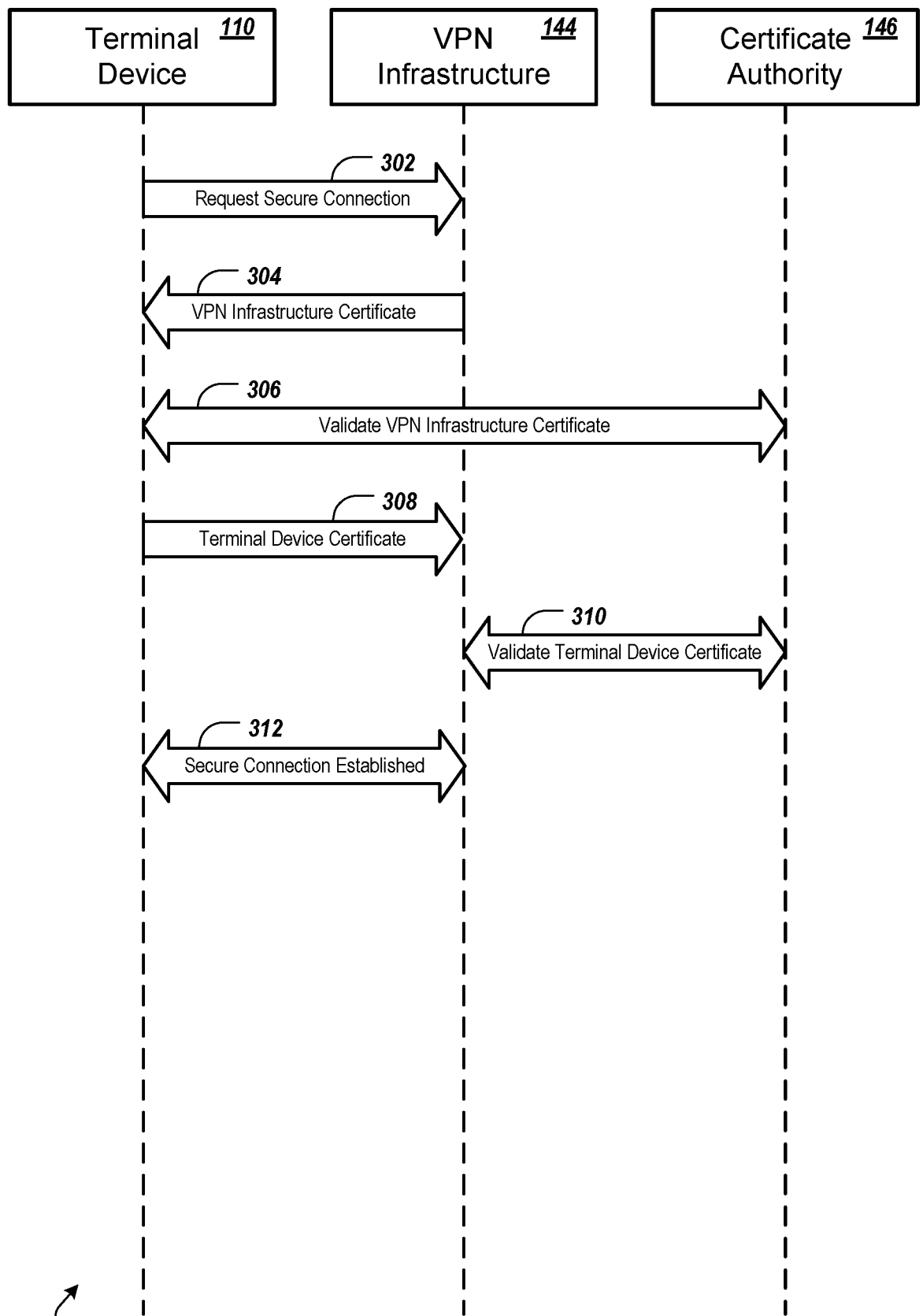
FIG. 3 depicts an example certificate-based protocol for establishing a secure connection between a terminal device and a remote server.

FIG. 3 depicts an example certificate-based protocol 300 for establishing a secure connection between a terminal device and a remote server. The certificate-based protocol 300, for example, is conceptually similar to the technique shown in FIG. 2B at stage (F), while including further details related to the technique and supporting processes. In the present example, the certificate-based protocol 300 can be performed by the terminal device 110 (also shown in FIG. 1 and FIGS. 2A-2E), the VPN infrastructure 144 (also shown in FIG. 1 and FIGS. 2A-2D), and the certificate authority 146 (e.g., also shown in FIG. 1 and FIGS. 2A-2D). As shown in FIG. 2B, for example, communication between the terminal device 110 and the remote server(s) 140 (e.g., including the VPN infrastructure 144 and the certificate authority 146) can occur over the short-range wireless connection 114 and the sharable internet connection 122, with the internet connection device 120 serving as a communication bridge between the terminal device 110 and the remote server(s) 140.

In general, the certificate-based protocol 300 can occur after a login process has been performed at the terminal device 110, the terminal device 110 has a connection to the public internet 150 (e.g., via the local wireless network 118 and the sharable internet connection 122 provided by the internet connection device 120), and each of the terminal device 110 and the VPN infrastructure 144 have been issued respective certificates (e.g., by the certificate authority 146). Issuance of the respective certificates can generally occur at different times, for example, with the terminal device certificate 210 being issued before or after the VPN infrastructure certificate 212. Existence of the respective certificates can generally be considered as a pre-condition for operation of the terminal device 110 and the VPN infrastructure 144, for example.

At 302, the terminal device 110 can request a secure connection with the VPN infrastructure 144. For example, an application running on the terminal device 110 can reference a network address (e.g., an internet protocol (IP) address, a uniform resource locator (URL) address, a hypertext transfer protocol (HTTP) address, or another sort of network address) of the VPN infrastructure 144 running on the remote server(s) 140. The terminal device application, for example, can use the network address to send a secure connection initiation message to the VPN infrastructure 144 over the local wireless network 118 and the sharable internet connection 122 provided by the internet connection device 120, and over the public internet 150 (e.g., shown in FIG. 2B). Communications between the terminal device 110 and the VPN infrastructure 144, for example, can occur over a secure communication protocol (e.g., using a cryptographic protocol such as Transport Layer Security (TLS), or another secure communication protocol). Setting up the secure connection, for example, can include a handshaking process in which the terminal device 110 and the VPN infrastructure 144 establish various parameters and settings to be used during a communication session, such as cipher and hash functions for to be used for encryption/decryption, keys to be used for encrypting/decrypting transmitted data, and other suitable session parameters and settings.

In some implementations, a request for a secure connection can include credentials of an operator of a terminal device. For example, the request for the secure connection provided by the terminal device 110 to the VPN infrastructure 144 (e.g., at 302) can include the operator credentials that had been entered by the operator of the terminal device 110 (e.g., during stage (B), shown in FIG. 2A) and that have been maintained at the device 110. Upon receiving the operator credentials, for example, the VPN infrastructure 144 can verify whether the credentials are valid (e.g., using the credential manager 148), and can continue the handshaking process in response to determining that the operator credentials are valid, or can terminate the handshaking process in response to determining that the operator credentials are invalid.

In some implementations, a request for a secure connection can include location information of a terminal device that requests the secure connection and/or an internet connection device that is used to facilitate the secure connection. For example, the request for the secure connection provided by the terminal device 110 to the VPN infrastructure 144 (e.g., at 302) can include location information (e.g., GPS coordinates, or another sort of location information) of the terminal device 110. As another example, the internet connection device 120 can append its own location information (e.g., GPS coordinates or another sort of location information) to the request for the secure connection (e.g., at 302). Upon receiving the location information, for example, the VPN infrastructure can compare the location information to an expected location of the terminal device 110 and/or the internet connection device 120 (e.g., based on expected location(s) for the device(s) maintained by the remote server(s) 140). If the location information matches the expected location(s), for example, the handshaking process can continue, whereas if the location information does not match the expected location(s), the handshaking process can be terminated.

At 304, the VPN infrastructure 144 can transmit its VPN infrastructure certificate 212 (shown in FIG. 2B) to the terminal device 110. For example, in response to receipt of the request for the secure connection from the terminal device 110, the VPN infrastructure 144 can retrieve its VPN infrastructure certificate 212 from local storage (e.g., a key store), and can transmit the certificate 212 to the terminal device 110. The VPN infrastructure 144, for example, can use the secure communication protocol to securely transmit the VPN infrastructure certificate 212 to the terminal device 110 over the public internet 150 and the local wireless network 118 via the internet connection device 120.

At 306, the terminal device 110 can determine whether the VPN infrastructure certificate 212 is a valid certificate, based on information provided by the certificate authority 146 via the remote server(s) 140. In some implementations, a terminal device can perform a certificate validation. The certificate authority 146, for example, can provide its public key to the terminal device 110 (e.g., at 306, or at a time prior to 306), and the terminal device 110 can use the public key of the certificate authority 146 to determine whether the received VPN infrastructure certificate 212 has been signed (e.g., with a corresponding private key of the certificate authority 146) and issued by the certificate authority 146. After validating the VPN infrastructure certificate 212, for example, the terminal device 110 can query the certificate authority 146, to ensure that the certificate 212 has not been revoked. In some implementations, a certificate authority can perform a certificate validation. For example, the terminal device 110 can securely transmit the received VPN infrastructure certificate 212 to the certificate authority 146, which can in turn validate the certificate 212, determine whether the certificate 212 has been revoked, and return a value that indicates whether the certificate 212 is currently valid or invalid.

At 308, the terminal device 110 can transmit its terminal device certificate 210 (shown in FIG. 2B) to the VPN infrastructure 144. The terminal device 110, for example, can retrieve its terminal device certificate 210 from local storage (e.g., a key store), and can transmit the certificate 210 to the VPN infrastructure 144. For example, after determining the VPN infrastructure certificate 212 is a valid certificate, the terminal device 110 can retrieve and securely transmit the terminal device certificate 210 over the local wireless network 118 and the public internet 150 via the internet connection device 120.

At 310, the VPN infrastructure 144 can determine whether the terminal device certificate 210 is a valid certificate, based on information provided by the certificate authority 146. In some implementations, a VPN infrastructure can perform a certificate validation. The certificate authority 146, for example, can provide its public key to the VPN infrastructure 144 (e.g., at 310, or at a time prior to 310), and the VPN infrastructure 144 can use the public key of the certificate authority 146 to determine whether the received terminal device certificate 210 has been signed (e.g., with a corresponding private key of the certificate authority 146) and issued by the certificate authority 146. After validating the terminal device certificate 210, for example, the VPN infrastructure 144 can query the certificate authority 146, to ensure that the certificate 210 has not been revoked. In some implementations, a certificate authority can perform a certificate validation. For example, the VPN infrastructure 144 can securely transmit the received terminal device certificate 210 to the certificate authority 146, which can in turn validate the certificate 210, determine whether the certificate 210 has been revoked, and return a value that indicates whether the certificate 210 is currently valid or invalid.

At 312, after the terminal device 110 and the VPN infrastructure 144 have exchanged their respective certificates and have each independently validated the other's certificate, a secure connection can be fully established between the terminal device 110 and the VPN infrastructure 144. That is, the terminal device 110 and the VPN infrastructure 144 can each trust that the other has been authorized by the certificate authority 146 to operate in the system 100. Thus, further communications can be conducted securely and in confidence (e.g., by sending encrypted data through a Virtual Private Network (VPN) tunnel, using a Secure Socket Layer (SSL) protocol, or another secure communication protocol).

Referring now to FIG. 2C, after the secure connection has been established between the terminal device 110 and the VPN infrastructure 144, an operator authentication process can be performed over the secure connection. While the previously describe process for establishing the secure connection between the terminal device 110, for example, can provide trust and security between the terminal device 110 and the VPN infrastructure 144, the operator authentication process can provide an additional layer of trust and security between the terminal device 110 and the remote terminal device services 142. As with the process for establishing the secure connection (e.g., the certificate based protocol 300), communications that occur between the terminal device 110 and the remote server 140 will be understood as occurring over the short-range wireless connection 114 and the sharable internet connection 122, with the internet connection device 120 serving as a communication bridge between the terminal device 110 and the remote server 140.

During stage (G), the terminal device 110 can provide credentials 222 of the operator of the terminal device 110 to the remote server(s) 140. For example, the terminal device 110 can retrieve (e.g., from local memory/storage) the operator credentials 222 that have previously been provided the operator of the terminal device (e.g., during stage (B), shown in FIG. 2A). As another example, (e.g., in response to an access timeout condition of the terminal device 110), the terminal device 110 can again present the login interface 220 (shown in FIG. 2A), and can again collect the operator credentials 222 from the operator of the terminal device 110. Upon retrieving (or collecting) the operator credentials 222, for example, the terminal device 110 can transmit the operator credentials 222 retrieved/collected at the terminal device 110 to the remote server(s) 140, over the secure connection that has been established between the terminal device 110 and the VPN infrastructure 144 of the remote server(s) 140, and over the temporary local wireless network 118 and the sharable internet connection 122 provided by the internet connection device 120. Upon receiving the operator credentials 222 from the terminal device 110, for example, the remote server(s) 140 can determine whether the received operator credentials are valid (e.g., by comparing the received operator credentials with stored credentials available from the credential manager 148).

During stage (H), after the operator's credentials have been authenticated as being valid, the remote server(s) 140 can provide an access token 224 to the terminal device (e.g., by transmitting the token 224 over the secure connection that has been established between the terminal device 110 and the VPN infrastructure 144 of the remote server(s) 140, over the sharable internet connection 122 and the local wireless network 118 provided by the internet connection device 120). For example, the credential manager 148 of the remote server(s) 140 can authenticate the operator credentials 222, and in response to determining that the credentials 222 are valid, can generate and provide the access token 224 for transmission to the terminal device 110. In general, the access token 224 can include data related to a logged-in operator of the terminal device 110 (e.g., including permissions, groups, expirations, etc.), and can be used to verify and provide access rights to various resources in the system 100 (e.g., including application-level and/or function-level features of the terminal device 110 and the remote terminal device services 142 of the remote server(s) 140). For example, the terminal device 110 can use the access token 224 to enable/disable features of the device 140, and/or to call application programming interfaces (APIs) included in terminal device applications. Upon receipt, for example, the access token 224 can be stored by the terminal device 110 (e.g., in local memory), can be removed when the operator is logged out, and can be replaced after each successful login.

Referring now to FIG. 2D, during stage (I), after the access token 224 has been received by the terminal device 110, the terminal device can access the remote terminal device services 142 of the remote server(s) 140. To locate the remote terminal device services 142, for example, a terminal device application 230 can reference a network address (e.g., an IP address, a URL address, an HTTP address, or another sort of network address) of the services 142 running on the remote server(s) 140. When accessing the remote terminal device services 142 (e.g., through an API call included in the terminal device application 230), for example, the terminal device 110 can provide its access token 224 (e.g., shown in FIG. 2C) along with data that corresponds to a request for access of the services 142. The access token 224 and the request data, for example, can be transmitted using the secure connection that has been established between the terminal device 110 and the VPN infrastructure 144, over the temporary local wireless network 118 and the sharable internet connection 122 provided by the internet connection device 120. Upon receiving the access token 224 and the request data, for example, the remote terminal device services 142 can determine whether the request is authorized (e.g., based on validity/permissions of the access token 224), and if so, can process the request using the request data. After the request has been processed, for example, the remote terminal device services 142 can provide return data (e.g., a result of the request processing) for transmission to the terminal device 110 over the secure connection.

Referring now to FIG. 2E, during stage (J), the terminal device 110 can detect that access to a private network that provides a connection to terminal device services (e.g., terminal device service 132, 142) has been restored. For example, the hardware/power failure that had impacted the LAN 152 (and/or the facility server(s) 130) and the WAN 154 (e.g., shown in FIG. 1) may have been repaired, and thus the terminal device 110 can discontinue use of the temporary local wireless network 118 and the sharable internet connection 122 provided by the internet connection device 120. In response to detecting that access to the private network that provides the connection to the terminal device services 132, 142 has been restored, for example, the terminal device 110 can present a notification (e.g., a visual and/or auditory notification) that informs an operator of the device 110 of the restoration of action. At an appropriate time after receiving the notification (e.g., possibly after completing the processing of a currently pending transaction), the operator of the terminal device 110 can indicate through the terminal device application 230 (shown in FIG. 2D) that the device's connection to the local wireless network 118 is to be terminated, and in response the terminal device 110 can disconnect from the local wireless network 118 and can turn off its short-range radio. After detecting that all previously connected terminal devices (e.g., terminal devices 110a-n, shown in FIG. 1) are now disconnected, for example, the internet connection device 120 can terminate the temporary local wireless network 118.

During stage (K), a rebuild process can be performed on the terminal device 110. Since the terminal device 110 has been connected to the public internet 150 for a period of time (albeit over a secure connection), there may be a possibility that the terminal device 150 has become compromised. Before allowing the terminal device 110 to reconnect to LAN 152 and communicate with the facility server(s) 130, for example, the terminal device's memory can automatically be wiped. After the memory of the terminal device 110 has been wiped, for example, the terminal device application(s) can be re-installed. Once the terminal device application(s) have been re-installed at the terminal device 110, for example, the terminal device 110 can again connect to the local terminal device services 132 running on the facility server(s) 130, via the LAN 152. By performing the rebuild process, for example, the system 100 can better ensure a virus-free environment for the terminal devices 110a-n, the facility server(s) 130, and the remote server(s) 140.

Figure 4:
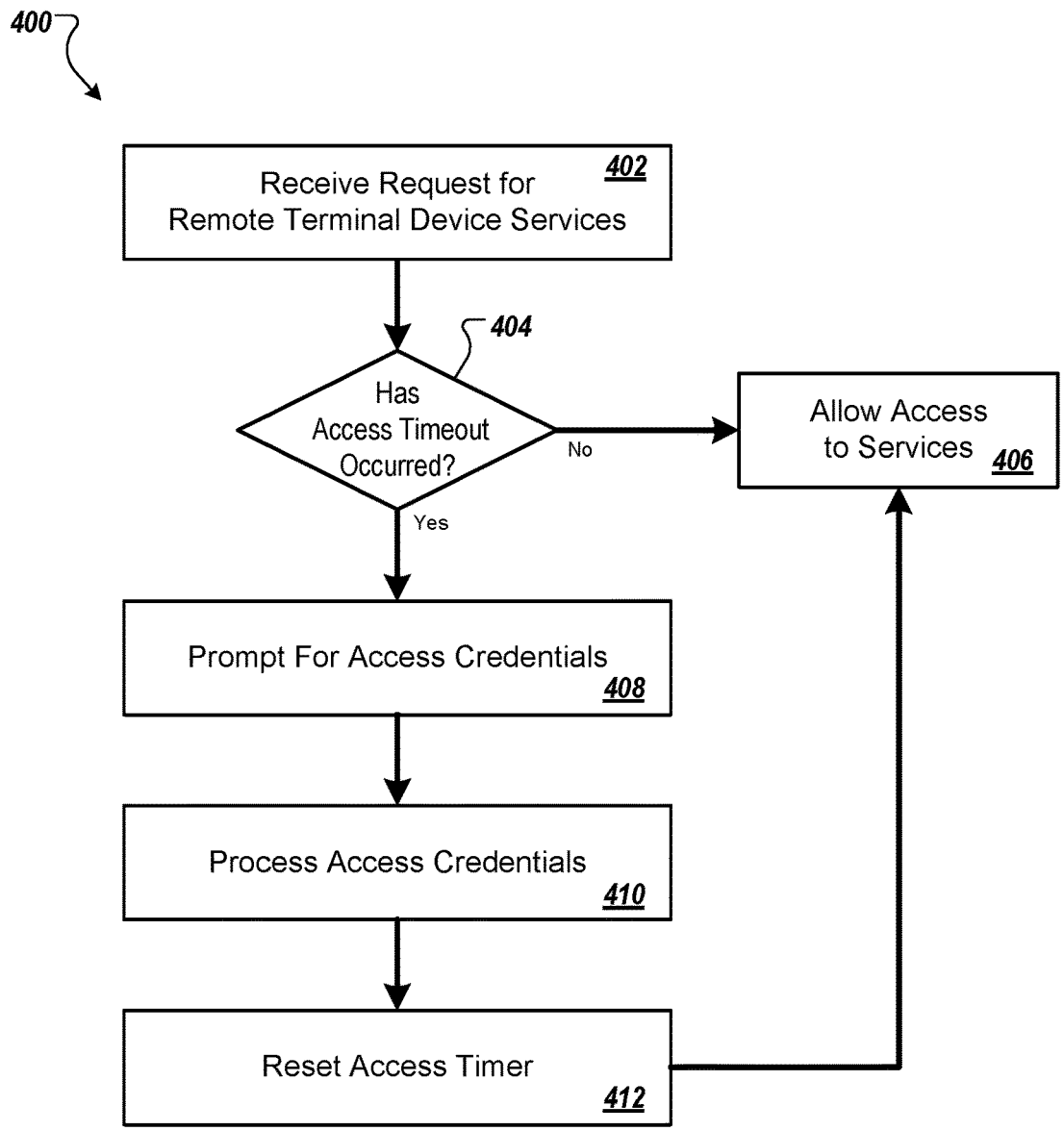
FIG. 4 is a flow diagram of an example technique for allowing access to remote terminal device services.

FIG. 4 is a flow diagram of an example technique 400 for allowing access to remote terminal device services. The technique 400, for example, can be performed during stage (I) (shown in FIG. 2D), after the terminal device 110 has established a secure connection with the remote server(s) 140 over the public internet 150 via the internet connection device 120 (shown in FIG. 2B), and after the operator's credentials have been verified by the remote server(s) 140 (shown in FIG. 2C). In the present example, the technique 400 can be performed by components of the system 100 (shown in FIG. 1) or the system 200 (shown in FIGS. 2A-2E), however other systems can also be used to perform the technique 400.

At 402, a request can be received for remote terminal device services. For example, the terminal device 110 (shown in FIG. 2D) can transmit a service request (e.g., by making an API call) to the remote terminal device services 142 (e.g., along with the access token 224, shown in FIG. 2C). The service request, for example, can be transmitted by the terminal device 110 over a VPN tunnel via the temporary local wireless network 118 and the sharable internet connection 122 provided by the internet connection device 120. The remote server(s) 140, for example, can receive the service request and the access token 224 using the VPN architecture 144.

At 404, a determination can be performed of whether an access timeout has occurred. For example, the remote terminal device services 142 can maintain an access timer for the terminal device 110 that tracks how long its current session over the VPN tunnel provided by the VPN infrastructure 144 has been active, and how much time has elapsed since a previous receipt of the operator credentials 222 (shown in FIG. 2C). If an amount of time that has elapsed since a previous receipt of operator credentials meets a threshold amount of time (e.g., fifteen minutes, thirty minutes, sixty minutes, or another suitable threshold amount of time), the remote terminal device services 142 can determine that the access timeout has occurred.

At 406, if the access timeout has not occurred, access to the remote terminal device services can be allowed. For example, the remote terminal device services 142 can determine whether the request is authorized (e.g., based on the operator credentials 222), and if so, can process the request. After the request has been processed, for example, the remote terminal device services 142 can optionally provide return data for transmission to the terminal 110 over the VPN tunnel.

At 408, if the access timeout has occurred, a prompt for access credentials can be provided. For example, the remote terminal device services 142 can transmit to the terminal device 110 over the VPN tunnel a request for the terminal device 110 to again collect and provide the operator credentials 222. In response to receiving the request, for example, the terminal device 110 can again provide the login interface 220 (shown in FIG. 2C) to collect the operator's credentials. Once the operator credentials 222 have been collected, for example, the credentials 222 can be resubmitted by transmitting the credentials 222 to the remote server(s) 140 over the VPN tunnel provided by the VPN infrastructure 144.

At 410, the access credentials can be processed. Upon receiving the resubmitted operator credentials 222, for example, the remote server(s) 140 can use the credential manager 148 to determine whether the credentials 222 are valid. If so, the access timer can be reset (at 412), and access to the remote terminal device services 142 can be allowed (at 406). Optionally, an updated access token 224 (shown in FIG. 2C) can be transmitted to the terminal device 110 over the VPN tunnel. For example, if the credential manager 148 determines that an operator of the terminal device 110 has changed from a previous processing of access credentials, the credential manager 148 can generate a new access token 224 for transmission to the terminal device 110. By maintaining an access timer and prompting for resubmission of operator credentials in response to an elapsed access timer, system security can generally be improved in the system 100. For example, an unattended terminal device may be more susceptible to attacks from malicious actors when the device is using a connection with the public internet 150, and maintaining the access timer can reduce the likelihood of attacks under such a scenario.

Figure 5:
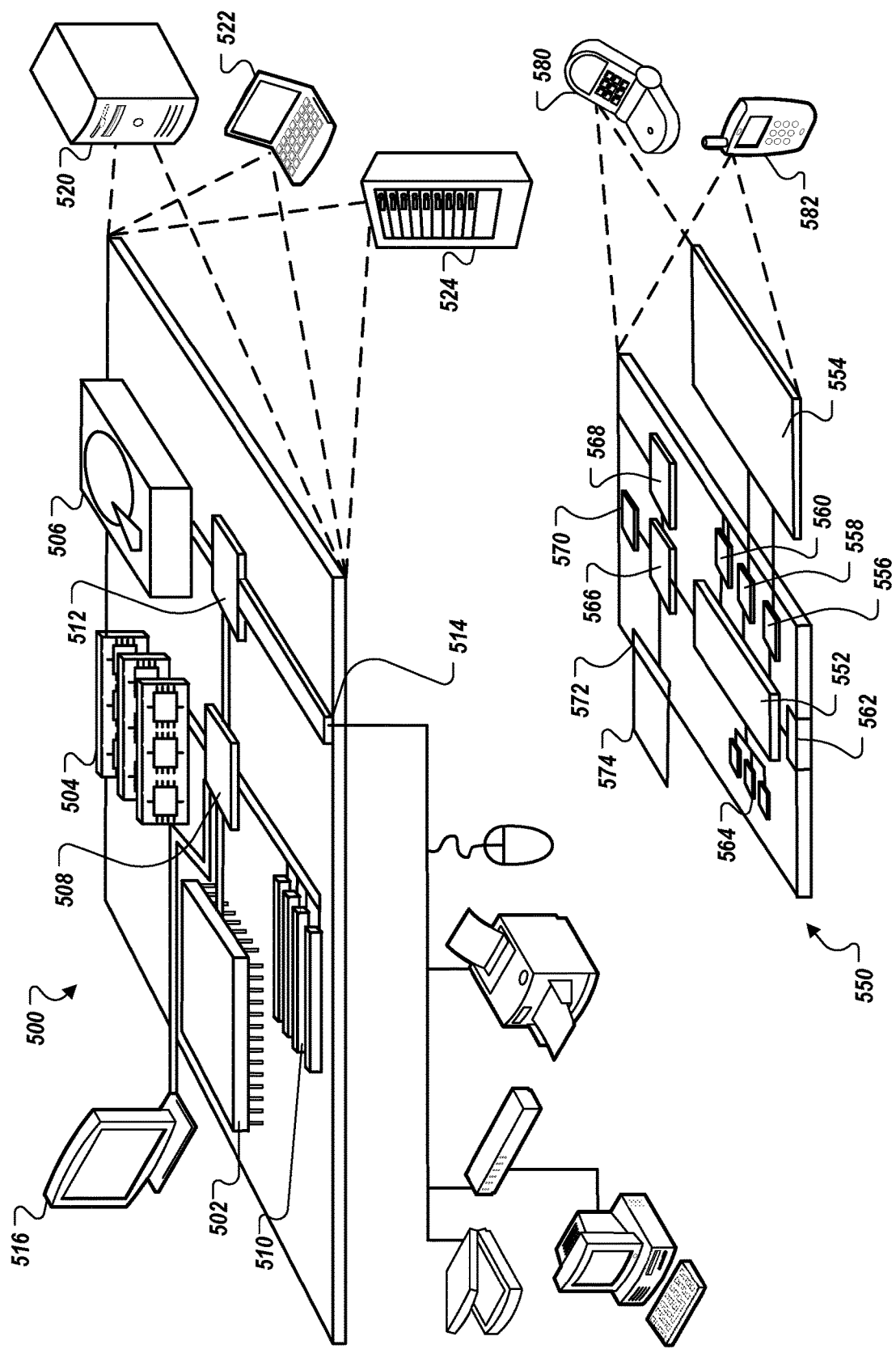
FIG. 5 is a schematic diagram that shows an example of a computing device and a mobile computing device.

FIG. 5 shows an example of a computing device 500 and an example of a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 can also be another form of computer-readable medium, such as a magnetic or optical disk.

The storage device 506 is capable of providing mass storage for the computing device 500. In some implementations, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which can accept various expansion cards (not shown). In the implementation, the low-speed interface 512 is coupled to the storage device 506 and the low-speed expansion port 514. The low-speed expansion port 514, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 520, or multiple times in a group of such servers. In addition, it can be implemented in a personal computer such as a laptop computer 522. It can also be implemented as part of a rack server system 524. Alternatively, components from the computing device 500 can be combined with other components in a mobile device (not shown), such as a mobile computing device 550. Each of such devices can contain one or more of the computing device 500 and the mobile computing device 550, and an entire system can be made up of multiple computing devices communicating with each other.

The mobile computing device 550 includes a processor 552, a memory 564, an input/output device such as a display 554, a communication interface 566, and a transceiver 568, among other components. The mobile computing device 550 can also be provided with a storage device, such as a micro-drive or other device, to provide additional storage. Each of the processor 552, the memory 564, the display 554, the communication interface 566, and the transceiver 568, are interconnected using various buses, and several of the components can be mounted on a common motherboard or in other manners as appropriate.

The processor 552 can execute instructions within the mobile computing device 550, including instructions stored in the memory 564. The processor 552 can be implemented as a chipset of chips that include separate and multiple analog and digital processors. The processor 552 can provide, for example, for coordination of the other components of the mobile computing device 550, such as control of user interfaces, applications run by the mobile computing device 550, and wireless communication by the mobile computing device 550.

The processor 552 can communicate with a user through a control interface 558 and a display interface 556 coupled to the display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can provide communication with the processor 552, so as to enable near area communication of the mobile computing device 550 with other devices. The external interface 562 can provide, for example, for wired communication in some implementations, or for wireless communication in other implementations, and multiple interfaces can also be used.

The memory 564 stores information within the mobile computing device 550. The memory 564 can be implemented as one or more of a computer-readable medium or media, a volatile memory unit or units, or a non-volatile memory unit or units. An expansion memory 574 can also be provided and connected to the mobile computing device 550 through an expansion interface 572, which can include, for example, a SIMM (Single In Line Memory Module) card interface. The expansion memory 574 can provide extra storage space for the mobile computing device 550, or can also store applications or other information for the mobile computing device 550. Specifically, the expansion memory 574 can include instructions to carry out or supplement the processes described above, and can include secure information also. Thus, for example, the expansion memory 574 can be provide as a security module for the mobile computing device 550, and can be programmed with instructions that permit secure use of the mobile computing device 550. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 can communicate wirelessly through the communication interface 566, which can include digital signal processing circuitry where necessary. The communication interface 566 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 568 using a radio-frequency. In addition, short-range communication can occur, such as using a Bluetooth, WiFi, or other such transceiver (not shown). In addition, a GPS (Global Positioning System) receiver module 570 can provide additional navigation- and location-related wireless data to the mobile computing device 550, which can be used as appropriate by applications running on the mobile computing device 550.

The mobile computing device 550 can also communicate audibly using an audio codec 560, which can receive spoken information from a user and convert it to usable digital information. The audio codec 560 can likewise generate audible sound for a user, such as through a speaker, e.g., in a handset of the mobile computing device 550. Such sound can include sound from voice telephone calls, can include recorded sound (e.g., voice messages, music files, etc.) and can also include sound generated by applications operating on the mobile computing device 550.

The mobile computing device 550 can be implemented in a number of different forms, as shown in the figure. For example, it can be implemented as a cellular telephone 580. It can also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer system for providing a terminal device with a secure remote service connection, the system comprising:
   the terminal device;
   an internet connection device; and
   a remote server,
   wherein the terminal device, the internet connection device, and the remote server each include one or more processors, memory, and storage devices storing respective instructions that, when executed, cause the respective terminal device, internet connection device, and remote server to perform operations comprising:
      establishing, by the internet connection device, a temporary local wireless network and a sharable internet connection, and outputting connection information for the temporary local wireless network;
      detecting, by the terminal device, the connection information that has been output by the internet connection device, and in response to detecting the connection information, using the connection information to connect to the temporary local wireless network;
      establishing, by the terminal device and the remote server, a secure connection between the terminal device and the remote server, over the temporary local wireless network and the sharable internet connection established by the internet connection device;
      after establishing the secure connection, receiving, by the remote server and from the terminal device over the secure connection, operator credentials submitted at the terminal device, and in response to receiving the operator credentials, transmitting, by the remote server and to the terminal device over the secure connection, an access token;
      transmitting, by the terminal device and to the remote server over the secure connection, a request to access a terminal device service hosted by the remote server, along with the access token; and
      in response to receiving the request to access the terminal device service along with the access token, executing application code for the terminal device service, by the remote server.

2. The computer system of claim 1, wherein the terminal device and the internet connection device have a short-range wireless connection over the temporary local wireless network, the internet connection device and the remote server have a long-range wireless connection over a public internet, and the internet connection device serves as a communication bridge between the terminal device and the remote server.

3. The computer system of claim 2, wherein the short-range wireless connection is a WiFi connection and the temporary local wireless network is a Wi-Fi network.

4. The computer system of claim 2, wherein the long-range wireless connection over the public internet is a long term evolution (LTE) or 5G connection that is provided via a communication tower that is in range of the internet connection device.

5. The computer system of claim 2, wherein establishing the secure connection between the terminal device and the remote server comprises:
   receiving, by a virtual private network (VPN) infrastructure of the remote server, a request for the secure connection;
   in response to receiving the request for the secure connection, transmitting, by the VPN infrastructure, a VPN infrastructure certificate for receipt by the terminal device;
   after receiving the VPN infrastructure certificate, validating the VPN infrastructure certificate, by the terminal device and based on VPN infrastructure certificate validation data provided by a certificate authority;
   in response to validating the VPN infrastructure certificate, transmitting, by the terminal device, a terminal device certificate for receipt by the VPN infrastructure of the remote server; and
   after receiving the terminal device certificate, validating the terminal device certificate, by the VPN infrastructure and based on terminal device certificate validation data provided by the certificate authority.

6. The computer system of claim 1, wherein the connection information for the temporary local wireless network includes a service set identifier (SSID) and a password for the temporary local wireless network.

7. The computer system of claim 1, wherein the connection information for the temporary local wireless network is usable for a single network session facilitated by the internet connection device and is not used again after the single network session is complete.

8. The computer system of claim 7, wherein multiple terminal devices are in communication with the internet connection device during the single network session, and each terminal device uses the same connection information.

9. The computer system of claim 1, wherein the connection information is visually output by a display of the internet connection device, and wherein detecting the connection information by the terminal device comprises performing a scan of the connection information using scanning hardware of the terminal device.

10. The computer system of claim 1, wherein the connection information is output by the internet connection device in a non-visual manner, and wherein detecting the connection information by the terminal device comprises using non-visual detection hardware of the terminal device to detect the connection information.

11. The computer system of claim 1, wherein the remote server includes a virtual private network (VPN) infrastructure, and wherein the secure connection is a VPN tunnel between the terminal device and the remote server.

12. The computer system of claim 1, further comprising:
   determining, by a credential manager of the remote server, whether the operator credentials are valid, wherein the access token is transmitted to the terminal device in response to the credential manager determining that the operator credentials are valid.

13. The computer system of claim 1, wherein the access token includes access permissions data for the terminal device service, for an operator that is currently logged in to the terminal device.

14. The computer system of claim 1, wherein the terminal device service is an application programming interface (API) that is hosted by the remote server, and wherein the request to access the terminal device service is an API call.

15. The computer system of claim 1, further comprising:
   determining, by the terminal device, that access to a private network has been restored that provides a connection to a local server that hosts a local version of the terminal device service;

in response to determining that access to the private network has been restored, discontinuing use of the temporary local wireless network and the sharable internet connection; and establishing, by the terminal device, a connection to the private network, and accessing the local version of the terminal device service.

16. The computer system of claim 1, further comprising: in response to detecting the connection information, turning on a short-range radio of the terminal device; and in response to determining that access to the private network has been restored, turning off the short-range radio of the terminal device.

17. The computer system of claim 16, further comprising: after use of the terminal local wireless network has been discontinued by the terminal device, terminating the temporary local wireless network, by the internet connection device.

18. The computer system of claim 16, further comprising: before accessing the local version of the terminal device service, wiping the memory of the terminal device, and re-installing a terminal device application of the terminal device.

19. The computer system of claim 1, further comprising: starting a timer that tracks an amount of time that has elapsed since the operator credentials have been submitted;

in response to receiving the request to access the terminal device service, determining whether the amount of time that has elapsed exceeds a threshold amount of time; and executing the application code for the terminal device service when the amount of time that has elapsed does not exceed the threshold amount of time.

20. The computer system of claim 19, further comprising: receiving, by the remote server and from the terminal device, a subsequent request to access the terminal device service;

in response to receiving the subsequent request to access the terminal device service, determining whether the amount of time that has elapsed exceeds the threshold amount of time; and prompting an operator of the terminal device to resubmit the operator credentials when the amount of time that has elapsed exceeds the threshold amount of time.

* * * * *